Nov. 29, 1966    H. ESSEL    3,288,293
PRESSURE FILTER

Filed Feb. 25, 1963    6 Sheets-Sheet 1

Inventor:
*Hermann Essel*
By:
*Michael S. Striker*
Attorney

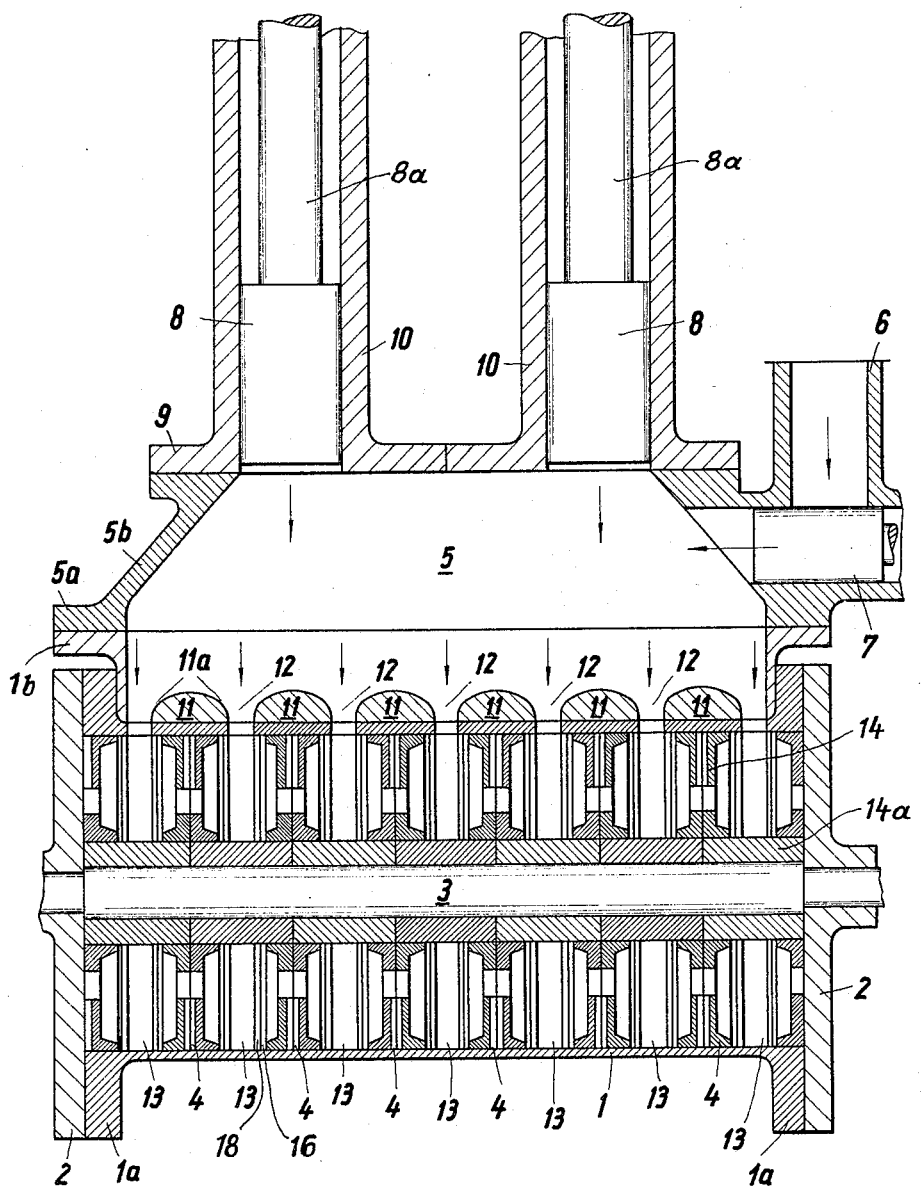

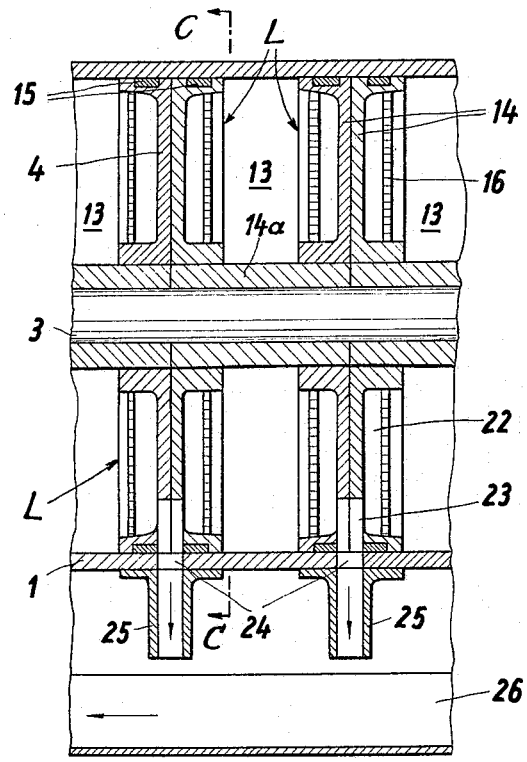
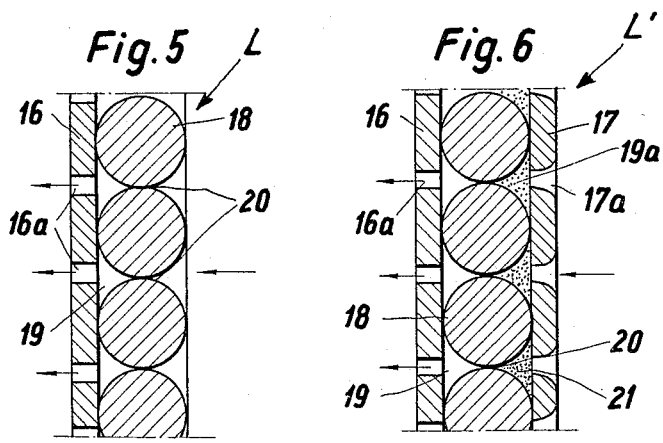

Nov. 29, 1966 H. ESSEL 3,288,293
PRESSURE FILTER
Filed Feb. 25, 1963 6 Sheets-Sheet 4

Inventor:
Hermann Essel
By:
Michael S. Striker
Attorney

United States Patent Office 3,288,293
Patented Nov. 29, 1966

3,288,293
PRESSURE FILTER
Hermann Essel, Hohlerweg 5, Siegen,
Westphalia, Germany
Filed Feb. 25, 1963, Ser. No. 260,423
Claims priority, application Germany, Feb. 22, 1962,
St 18,886
10 Claims. (Cl. 210—107)

The present invention relates to pressure filters in general, and more particularly to so-called enclosed pressure filters into which material to be filtered is charged under pressure. For example, the filters of this invention may be used for dewatering of coal muds, for clarifying of water and for many other purposes.

All conventional pressure filters of which I have knowledge at this time operate intermittently and, accordingly, the output of such filters is rather low. Furthermore, removal of cakes from such filters consumes much time, particularly if the filter must operate at high pressures of up to and above 100 atmospheres absolute pressure. In fact, pressures necessary to remove the cake or cakes from such conventional filters normally exceed the operating pressures. Moreover, friction developing between the solid cake and cakes and certain parts of the filter which are in direct contact with the cakes may damage the apparatus, particularly the filtering leaves.

Accordingly, it is an important object of this invention to provide a very compact, comparatively simple and inexpensive pressure filter which may be operated continuously and wherein evacuation of one or more cakes may be brought about at pressures which prevail when the filter is in actual use.

Another object of the invention is to provide a pressure filter of the just outlined characteristics which may operate at pressures above 50 atmospheres and even above 100 atmospheres absolute pressure without in any way affecting the evacuation of cakes, and which may be rapidly adjusted in actual use to change the percentage of liquid ingredient in the cakes.

A further object of the invention is to provide a pressure filter which is capable of separating feed material into a solid component and liquid filtrate in such a way that the filtrate contains minimal quantities or is entirely free of solid matter.

An additional object of the invention is to provide a pressure filter which embodies an automatic cleaning feature for its leaves, which need not be taken apart to evacuate the solid component, which may be constructed in any desired size and whose operation may be controlled with utmost precision.

A concomitant object of the invention is to provide an improved filtering element for use in a filter of the above outlined characteristics.

With the above objects in view, one feature of the invention resides in the provision of a pressure filter which comprises a vessel including a shell which is provided with one or more inlets for admission of feed material, with one or more ports for evacuation of filtrate, and with one or more outlets for evacuation of the solid component, means for compressing the material in the shell, and one or more filtering wheels which rotate in the shell and which actually separate the solid component from the filtrate by embodying suitable filtering elements which permit only the passage of liquid filtrate. The wheels compel the solid component to rotate in the shell or the wheels are rotated by the solid component so as to reduce or to eliminate friction between the solid component and the filtering elements.

The novel features which are considered as characteristic of the invention are set forth in particular in the appended claims. The pressure filter itself, however, both as to its construction and its method of operation, together with additional features and advantages thereof, will be best understood from the following detailed description of certain specific embodiments with reference to the accompanying drawings, in which:

FIG. 3 is a horizontal section as seen in the direction of arrows from the line B—B of FIG. 1;

FIG. 4 is a greatly enlarged fragmentary detail view of the structure shown in FIG. 3;

FIG. 5 is a fragmentary axial section through a filtering element which may be utilized in the apparatus of FIGS. 1–4;

FIG. 6 is a similar fragmentary axial section through a modified filtering element;

Figure 1:
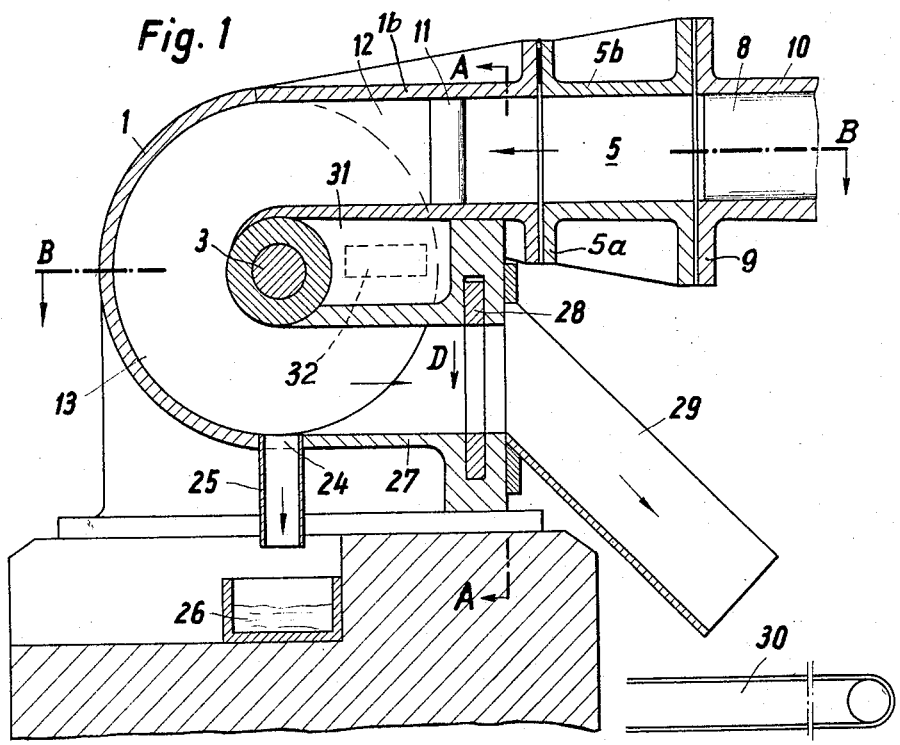
FIG. 1 is a transverse vertical section through a portion of a pressure filter which embodies one form of the invention.

Referring now in greater detail to the drawings, and first to FIGS. 1 and 3, there is shown a pressure filter including a vessel which comprises a cylindrical mantle or shell 1 having at its axial ends flanges 1a secured to end walls or covers 2. The shell 1 defines an internal space which receives the feed material to be filtered at elevated pressure and which accommodates a coaxial drive shaft 3. This shaft is journalled in the covers 2 and is driven by a suitable drive, not shown, to rotate a series of axially spaced filtering wheels 4 which are accommodated in the shell 1 and which define between themselves a plurality of separate annular filtering chambers 13. The means securing each wheel 4 to the drive shaft 3 may comprise suitable keys or the like, not shown. If desired, the shell 1 may be reinforced by axially parallel bolts which connect the flanges 1a to each other. Such bolts may be used if the pressure filter operates at very high pressures in the range of up to and higher than 100 atmospheres absolute pressure to take up some axial stresses to which the shell is subjected when the filter is in actual use.

The shell 1 comprises a tangentially arranged horizontal extension 1b which is sealingly connected or which is integral therewith, and which is sealingly connected with the flanges 5a of a housing 5b. This housing serves as a manifold to receive feed material and to deliver such material in a series of streams through spaced inlets 12 provided in the extension 1b and into the respective filtering chambers 13. The internal compartments 5 of the manifold 5b receives feed material through an intake 6 which is controlled by a valve here shown as a reciprocable plunger 7.

The right-hand end of the manifold 5b, as viewed in FIG. 1, is sealed by a wall member 9 which is rigid with a pair of cylinders 10 each accommodating a pressure generating piston 8. These pistons serve as a means for compressing feed material in the pressure compartment 5 and for advancing such material through the inlets 12 and into the chambers 13. The piston rods 8a may be reciprocated by a crankshaft or by a suitable hydraulic unit, not shown.

The inlets 12 are separated from each other by guide ribs 11 provided with rounded surfaces 11a to direct streams of feed material into the respective annular chambers 13. The ribs 11 are rigid with the extension 1b of the shell 1 and are accommodated in the compartment 5.

As shown in FIG. 4, each wheel 4 comprises two mirror symmetrical discs 14 which are in face-to-face abutment with and which are preferably connected to each other by means of bolts or the like, not shown, so that each pair of cooperating discs forms a rigid unit which rotates with the drive shaft 3. The rim of each wheel 4 is formed with circumferential grooves for sealing rings 15 which engage the internal surface of the shell 1 to prevent leakage of feed material or filtrate between the adjacent chambers 13. For example, the rings 15 may consist of rubber or of similar elastically deformable material.

Figure 7:
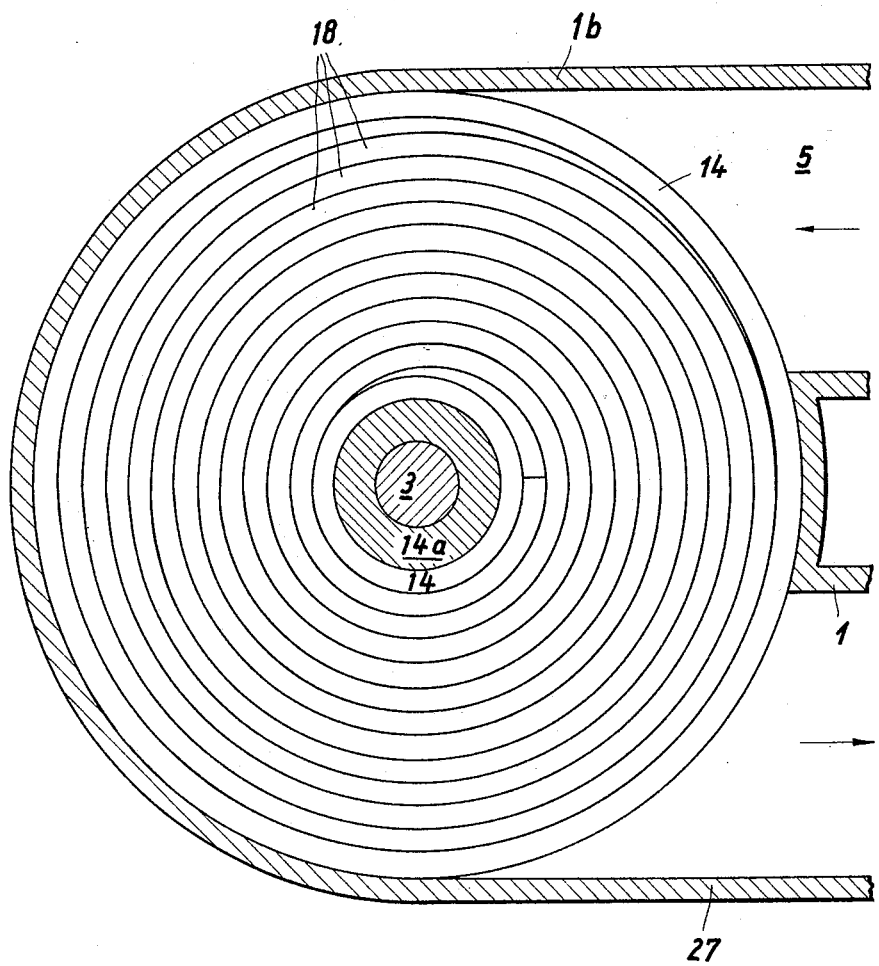
FIG. 7 is an enlarged transverse vertical section through the shell of the filter press, showing a helically convoluted component part of a filtering element, the section of FIG. 7 being taken in the direction of arrows as seen from the line C—C of FIG. 4.

The rims of discs receive or are connected with pairs of annular filtering elements L, also called leaves, one of which is shown in FIG. 5. One such leaf L is provided at the outer side of each disc 14 so that a filtering chamber 13 is actually bounded by the shell 1, by two axially spaced filtering leaves, and by a hub 14a which latter may form part of a disc 14. The leaf L of FIG. 5 comprises a foraminous annular plate 16 which is formed with axially parallel apertures 16a, and a helically convoluted spring 18 (see also FIG. 7) which resembles a torsion spring and which is disposed in a plane adjacent to the exposed side of the plate 16 and perpendicular to the axes of the wheels 4. In other words, the spring 18 is first to come into contact with feed material which is being admitted through the respective inlet 12. While it is possible to use springs of oval or polygonal cross section, it is normally preferred to use springs of circular cross section and to arrange the convolutions in close proximity of each other so that they actually touch, as at 20 (see FIG. 5). The liquid component escapes through minute gaps and capillary openings between the adjacent convolutions of the spring. The plates 16 are fixed to the respective discs 14, and these discs may be connected with the innermost and outermost convolutions of the respective springs 18. The distribution of apertures 16a is preferably such that they communicate with helical passages 19 defined by the convolutions of the springs 18 so that the filtrate which penetrates through the gaps between the convolutions and enters the passages 19 may flow through the apertures 16a and toward radial discharge openings 23 in the rims of wheels 4 to be discharged through ports 24 provided in and through registering nipples 25 provided on the shell 1, see FIGS. 1 and 4. Thus, and if each wheel 4 is formed with one discharge opening 23, outflow of filtrate from the chambers 13 takes place only once during each revolution of the shaft 3. On its way from the apertures 16a toward the respective discharge openings 23, the filtrate flows through annular spaces 22 extending between the inner sides of the plates 16 and the respective discs 14. The filtrate flowing through the nipples 25 is collected by an inclined trough 26 or the like.

FIG. 6 shows a modified filtering leaf L' which comprises all of the components of a leaf L and a second foraminous plate 17 which is adjacent to the outer side of the helical spring 18. The walls bounding the apertures 17a in the plate 17 are of conical or nearly conical shape and converge in a direction toward a helical channel 19a defined by the inner side of the plate 17 and the convolutions of the spring 18. The channel 19a may be filled with a filtering mass 21 which performs the function of a coarse filter and which may consist of Kieselguhr, wood meal or the like. However, it is equally possible to operate without such filtering mass because the channel 19a may be filled by solid particles of feed material, e.g., comminuted coal or the like, and such particles of feed material then form a coarse filter to collect solid particulate matter which penetrates through the apertures 17a.

Figure 2:
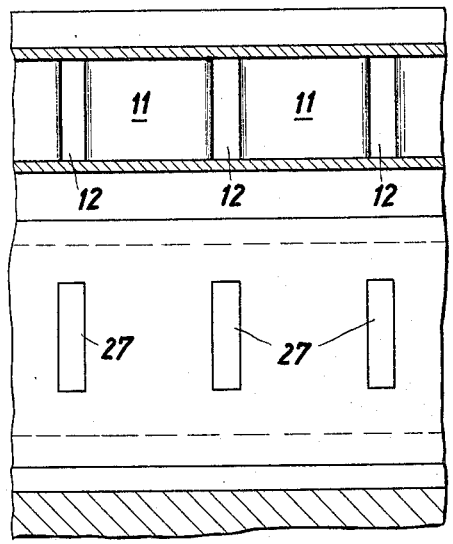
FIG. 2 is a vertical section as seen in the direction of arrows from the line A—A of FIG. 1, showing a series of inlets for feed material and a series of outlets for evacuation of cakes from the filtering chambers.

Referring again to FIG. 1, the vessel is provided with outlets 27 (see also FIG. 2) which are tangential to the shell 1 and which are closely adjacent to the extension 1b so that feed material admitted through the extension 1b must travel along a circular path extending through more than 180 degrees, preferably through almost 360 degrees, prior to being discharged through the respective outlets which communicate with the chambers 13 and which are disposed between the rims of adjacent wheels 4. The outlets 27 discharge cakes of solid particulate matter into a chute 29 so that the cakes may descend by gravity feed onto the upper run of an endless belt 30 or a similar take-off conveyor. All of the outlets 27 may discharge into a common chute 29 or into a common evacuating pipe, not shown in FIG. 1.

The outlets 27 are controlled by one or more valves which may assume the form of apertured baffles here shown as push plates 28. While it is possible to provide a separate apertured push plate for each outlet 27, it is often preferred to use a single push plate for all of the outlets so that the effective cross-sectional area of each outlet may be adjusted by means of a single actuating device or by a single manual adjustment of the plate 28.

The pressure filter of FIGS. 1 to 4 operates as follows:

At the time the operation is started, the push plate 28 is moved to sealing position so that the chambers 13 are sealed from the atmosphere. The plunger 7 is withdrawn in a direction to the right, as viewed in FIG. 3, so that the pressure compartment 5 may be filled with feed material which is admitted through the intake 6. For example, such feed material may consist of comminuted particles of coal which float in water. The material fills the compartment 5 and flows through the inlets 12 to enter and to fill the chambers 13. In the next step, the plunger 7 seals the compartment 5 from the intake 6 and the pistons 8 are caused to perform a working stroke (i.e., downwardly, as viewed in FIG. 3 or horizontally and to the left, as viewed in FIG. 1) to subject the material to strong compressive forces and to expel filtrate through the leaves L or L' so that the filtrate flows into the trough 26. When the compression stroke is completed, the pistons 8 are withdrawn in a direction away from the compartment 5 in order that the manifold 5b may receive a new supply of feed material as soon as the plunger 7 permits inflow of such material through the intake 6.

The shaft 3 drives the wheels 4 so that the material entering the chambers 13 is compelled to participate in rotary movements of the respective wheels and is gradually transformed into cakes which are expelled in a fully automatic way as soon as they reach the outlets 27. Such cakes travel in arcuate paths and in an anticlockwise direction, as viewed in FIG. 1, i.e., from the inlets 12 toward and through the respective outlets 27. The cakes continue to discharge liquid filtrate while travelling along the internal surface of the shell 1 on their way toward the respective outlets 27 and are dewaterized at the time they are ready to be evacuated from the apparatus. In other words, the space at the inner side of the closed push plate 28 accommodates plugs of dewaterized material which is ready to descend into the chute 29 and onto the take-off conveyor 30. The filtrate is evacuated in the previously described manner by penetrating through the leaves L or L', through the passages 22 and discharge openings 23, and through the ports 24 and nipples 25 to flow into the trough 26.

The push plate 28 is moved to open or partly open position as soon as the outlets 27 are sealed by plugs of dewaterized material, i.e., as soon as such material by itself forms a seal to prevent escape of filtrate through the outlets 27. Thus, the push plate 28 will be moved to at least partly open position as soon as the solid particles of feed material form an effective seal between the compartment 5 and the atmosphere.

As the pressure filter continues to operate, the plate 28 is maintained in at least partly open position so that the solid ingredients of feed material and the filtrate may be discharged continuously, whereas the delivery of feed material into the compartment 5 occurs intermittently, namely, subsequent to each return stroke of the pistons 8. Such continuous discharge of caked material is due to the provision of wheels 4 which compel the cakes to share their rotary movements and to travel from the inlets 12 toward the respective outlets 27. It will be readily understood that the means which reciprocates the pressure generating pistons 8 may also operate the plunger 7 so that the movements of this plunger are synchronized with the movements of the pistons 8. As stated hereinabove, the means for reciprocating the pistons 8 may assume the form of a crank shaft which latter, through suitable motion transmitting linkage or the like, moves the plunger 7 to the sealing position of FIG. 3 before the pistons 8 begin their compression strokes, and which retracts the plunger 7 from sealing position at the time the pistons 8 have returned to or at the time the pistons 8 move toward their retracted positions.

The plate 28 also serves as a means for regulating the duration of filtering action upon the feed material which is admitted into the chambers 13. Thus, if the plate 28 is partially open so that it screens portions of the outlets 27, evacuation of caked material is slower. Such caked material travels through the outlets 27 at a rate which depends on the extent to which the outlets are closed by the plate 28. In other words, merely by adjusting the position of the plate 28 according to the arrow D, one can control the percentage of liquid matter which remains in the material that is being discharged through the outlets 27. As a rule, the time necessary to complete the filtering operation upon a mass of feed material which is admitted into a chamber 13 is between 30 and 60 seconds. The r.p.m. of the drive shaft 3 is adjusted accordingly. It will be readily understood that the plate 28 may be adjusted by hand or in a fully automatic way, preferably in response to changes in pressure prevailing in the compartment 5. Thus, if the pressure in the compartment 5 increases beyond a predetermined magnitude, the plate 28 may be moved further toward its fully open position, or vice versa.

As explained in connection with FIG. 1, it is highly advisable to arrange the outlets 27 in close proximity of the inlets 12 so that the solid particulate matter of feed material must travel in a path which extends through nearly 360 degrees prior to being evacuated from the chambers 13. The partition 31 which is located between the row of inlets 12 and the row of outlets 27 may accommodate suitable brushes 32 or other types of cleaning means which remove impurities from the leaves L or L', i.e., from the outer sides of the convoluted springs 18 or from the outer sides of the foraminous plates 17. Such cleaning means may also assume the form of flexible wiper blades, of rigid strips made of steel or other wear-resistant material, or the like.

The number of wheels 4 may be selected at will and depends on the desired capacity of the pressure filter. In its simplest form, the filter comprises a single wheel 104 (see FIG. 8) which is disposed in a short shell 101 intermediate the covers 102. In this embodiment of the invention, the covers 102 may perform the function of pistons 8 by moving toward and away from each other to alternatively compress the newly admitted feed material or to permit introduction of a new supply of such material. The arrangement of inlets 112 and outlets may be similar to or identical with that described in connection with FIGS. 1 to 4. The shaft 103 is rotated by a worm gear drive 135.

If it is desired to expel all or nearly all liquid matter, the chambers 13 are comparatively narrow to insure that all zones of feed material entering the chambers are rather close to the leaves L and L'. For example, the width of the chambers, as seen in the axial direction of the shell 1 or 101, may be in the range of 50–80 mm. Of course, the extent to which the liquid matter is expelled also depends on pressures to which the feed material is subjected. Such pressures normally exceed the range of 40–50 atmospheres absolute pressure.

Figure 9:
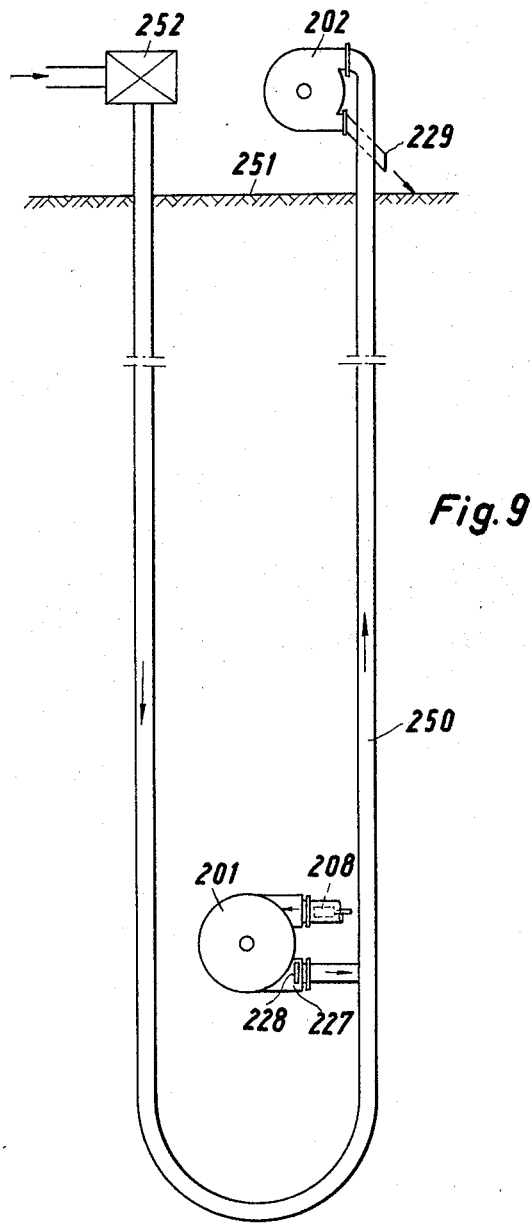
FIG. 9 is a schematic section through a hydraulic conveyor arranged to receive material through the outlet of a pressure filter which embodies the invention.

The pressure filter of this invention may be used with great advantage in connection with pneumatic or hydraulic conveyors, particularly for delivering the solid component into the pipe of a hydraulic conveyor. This is shown in FIG. 9 which illustrates a pressure filter 201 according to FIGS. 1–4 whose outlet 227 discharges material into a hydraulic pipe 250. This pipe may reach in form of a two branch loop from the soil 251 to the bottom of a pit which may be several hundred meters below the soil; at the one end of said pipe water is pumped into it by a pump 252. The material, e.g. dried coal slush, is discharged by the pressure filter 201 into said pipe 250 and transported through the pipe 250 upwardly by the water to another pressure filter 202, by which the material is dried and discharged through a chute 229. Of course, the pressure generated by the piston or pistons 208 of the pressure filter shown in FIG. 9 must be sufficient to overcome the pressures prevailing in the pipe 250 which forms part of a hydraulic conveyor; otherwise, the pressure prevailing in the pipe 250 would prevent entry of solid material. In such systems, the push plate 228 may remain in open position because the cake discharged through the outlet 227 automatically provides a seal between the pressure compartment of the filter and the interior of the pipe 250.

In all embodiments of my invention, the speed of the solid component may equal the speed of the filtering wheel or wheels so that there is no friction between the filtering elements and the cake. Since the outlets are preferably tangential to the shell of the vessel, they offer little resistance to advance of the cakes such as could hinder the progress of cakes if they were compelled to travel in a meandering path.

It is also possible to omit the drive for the shaft 3 and to cause the filtering wheels 4 to rotate in response to compression strokes of the pistons 8. In such instances, the evacuation of cakes occurs intermittently when the pistons 8 perform a compression stroke. The wheels 4 are entrained by the dewaterized cakes and rotate with the cakes in a direction from the inlets toward the respective outlets, i.e., in the same direction in which the solid component of feed material is compelled to advance in the shell 1.

A modified filtering leaf which can be utilized in the filter of the present invention may consist solely of a helical spring 18 so that the plates 16 and 17 may be dispensed with.

Figure 8:
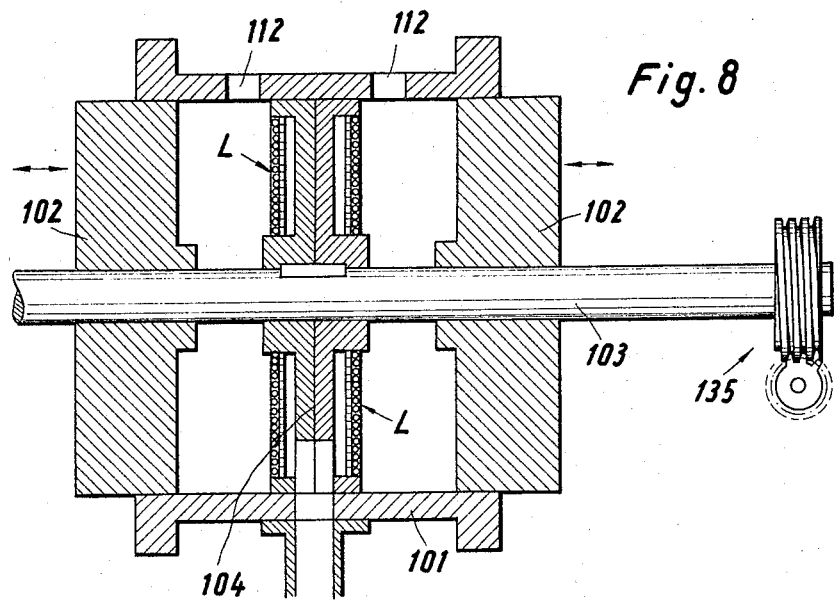
FIG. 8 is a schematic axial section through a modified pressure filter which comprises a single filtering wheel and wherein the covers of the shell simultaneously serve to generate the compressive force which causes the feed material to become separated into a liquid and a solid component.
Figure 10:
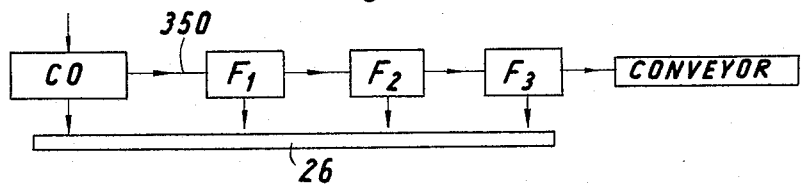
FIG. 10 is a schematic view of a series of pressure filters and of a condenser which delivers feed material into one of the filters.

It goes without saying that two or more pressure filters $F_1$, $F_2$, $F_3$ of the type shown in FIG. 1 or 8 may be connected in series (see FIG. 10) to gradually remove the liquid component from a feed material, such as coal mud or the like. It is also possible to provide one or more conventional concentrators CO through which the feed material is caused to pass prior to being admitted into the filter of my present invention so that the material loses some liquid before it can enter the filter. In FIG. 10, the concentrator CO delivers partially dewatered feed material into the first filter $F_1$. The conduit 350 which connects the concentrator CO with the intake of the filter $F_1$ is a pressure conduit, i.e., the feed material is delivered to the pressure compartment of the filter $F_1$ at an initial pressure even before such material is compressed in this filter.

The pressure filter of the present invention may be utilized to obtain cakes whose liquid content is between 12 and 15 percent. The filtrate is absolutely clear.

In the appended claims, the expression "solid component" is utilized to define the solid particulate matter and such percentages of liquid ingredient which remain in the material passing through the outlets of the vessel.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A pressure filter for separating filtrate from the solid component of a feed material, such as coal mud and the like, comprising a vessel including a shell which defines a feed-receiving space, said vessel having inlet means for admission of feed material and outlet means for evacuation of the solid component; rotary filtering wheel means provided in and dividing said space into a plurality of separate filtering chambers, said wheel means comprising a plurality of coaxial filtering wheels and being arranged to separate filtrate from the feed material and to rotate with the solid component from said inlet means toward said outlet means; a driven shaft coaxially secured to said filtering wheels and journalled in said vessel; compressing means for compressing the feed material in said chambers, said compressing means comprising housing means defining an internal compartment which communicates with said chambers through said inlet means, sealable intake means for admitting feed material into said compartment, and a device for compressing the feed material in said compartment so that the feed material is forced through said inlet means and into said chambers; and valve means for sealing said intake means when said device compresses the feed material in said internal compartment.

2. A pressure filter for separating filtrate from the solid component of a feed material, such as coal mud and the like, comprising a vessel including a shell which defines a feed-receiving space, said vessel having inlet means for admission of feed material and outlet means for evacuation of the solid component; rotary filtering wheel means provided in and dividing said space into a plurality of separate filtering chambers, said wheel means being arranged to separate filtrate from the feed material and to rotate with the solid component from said inlet means toward said outlet means; compressing means for compressing the feed material in said chambers, said compressing means comprising housing means defining an internal compartment which communicates with said chambers through said inlet means, sealable intake means for admitting feed material into said compartment, and a device for compressing the feed material in said compartment so that the feed material is forced through said inlet means and into said chambers; and means for sealing said intake means when said device compresses the feed material in said internal compartment.

3. A pressure filter as set forth in claim 2, wherein said shell defines a cylindrical feed-receiving space and wherein said inlet means extends tangentially of said cylindrical space.

4. A pressure filter as set forth in claim 2, wherein said shell defines a cylindrical feed-receiving space and wherein said outlet means extends tangentially of said cylindrical space.

5. A pressure filter as set forth in claim 2, wherein said inlet means and said outlet means are substantially parallel to each other.

6. A pressure filter as set forth in claim 2, wherein said shell is provided with port means and said wheel means comprises at least one filtering wheel having opening means for delivering filtrate to said port means, said filtering wheel further comprising at least one filtering element disposed between said opening means and one of said chambers so that the filtrate must pass through said element on its way to said opening means, and further comprising cleaning means disposed in said one chamber between said inlet means and said outlet means for removing the solid component from said filtering element.

7. A pressure filter as set forth in claim 6, wherein said filtering element comprises a helically convoluted member disposed in a plane which is substantially normal to the axis of said filtering wheel and wherein said cleaning means is arranged to remove the solid component from one side of said helically convoluted member.

8. A pressure filter as set forth in claim 6, wherein said filtering element comprises a foraminous plate located in a plane which is substantially normal to the axis of said filtering wheel and wherein said cleaning means is arranged to remove the solid component from one side of said foraminous plate.

9. A pressure filter as set forth in claim 2, wherein said compressing device comprises at least one cylinder and piston unit mounted on said housing means.

10. A pressure filter as set forth in claim 2, wherein said wheel means comprises a plurality of coaxial filtering wheels.

References Cited by the Examiner

UNITED STATES PATENTS

| | | | |
|---|---|---|---|
| Re. 19,359 | 11/1934 | Armstrong | 210—494 |
| 601,785 | 4/1898 | Wireback | 210—494 X |
| 816,440 | 3/1906 | Dunham | 210—391 X |
| 920,739 | 5/1909 | Hedges et al. | 210—398 X |
| 1,227,983 | 5/1917 | Vallez | 210—398 X |
| 1,833,335 | 11/1931 | Prutzman | 210—416 X |
| 2,073,026 | 3/1937 | Renfrew et al. | 210—416 X |
| 2,793,583 | 5/1957 | Messing | 100—158 X |
| 2,867,288 | 1/1959 | Turner | 210—332 X |
| 2,932,396 | 4/1960 | Richter | 210—332 X |
| 3,096,278 | 7/1963 | Francom | 210—331 X |

FOREIGN PATENTS

| | | |
|---|---|---|
| 9,261 | of 1900 | Great Britain. |
| 297,354 | 12/1928 | Great Britain. |
| 784,219 | 10/1957 | Great Britain. |
| 449,854 | 7/1949 | Italy. |

REUBEN FRIEDMAN, *Primary Examiner.*

D. M. RIESS, *Assistant Examiner.*